United States Patent [19]
Classon et al.

[11] Patent Number: 5,558,524
[45] Date of Patent: Sep. 24, 1996

[54] CABLE CONNECTION FOR A METAL-ENCAPSULATED, GAS-INSULATED, HIGH-VOLTAGE SWITCHING INSTALLATION

[75] Inventors: John Å. Classon, Ludvika, Sweden; Herbert Schifko, Glattbrugg, Switzerland

[73] Assignee: ABB Management AG, Baden, Switzerland

[21] Appl. No.: 411,561

[22] Filed: Mar. 28, 1995

[30]  Foreign Application Priority Data

Apr. 19, 1994 [CH] Switzerland ............................ 1217/94

[51] Int. Cl.⁶ .................................................. H01R 4/66
[52] U.S. Cl. ............................ 439/92; 439/921; 174/21 R
[58] Field of Search ................................. 439/92, 95, 96, 439/97, 100, 610, 921, 212, 213, 801; 174/176 F, 25 G, 21 R; 218/55

[56]  References Cited

FOREIGN PATENT DOCUMENTS

| 2459737 | 7/1976 | Germany . |
| 3109669A1 | 11/1982 | Germany . |
| 52-146842 | 6/1977 | Japan . |
| 54-122634 | 9/1979 | Japan . |

*Primary Examiner*—Neil Abrams
*Attorney, Agent, or Firm*—Burns, Doane, Swecker & Mathis

[57]  ABSTRACT

The cable connection is provided for a metal-encapsulated, gas-insulated, high-voltage switching installation. It has a connection enclosure (23) which surrounds connecting parts which are connected to the active parts of the gas-insulated, high-voltage switching installation, and cable connection encapsulation (18) which is connected to the connection enclosure (23) and surrounds a cable termination (14) with an end bolt (15). In addition, it has an electrically conductive connecting piece which is inserted between the end bolt (15) and the connecting parts. It is intended to create a cable connection for a metal-encapsulated, gas-insulated, high-voltage switching installation, which cable connection makes it possible to fit and remove the high-voltage cable easily and quickly and makes it possible to ground this cable reliably and in a manner which can be installed easily. This is achieved in that the electrically conductive connecting piece is constructed such that it can easily be removed, in that, after removal of the connecting piece, a separation which is designed as an isolating gap is produced between the end bolt (15) and the connecting parts, and in that a grounding device (67) which can easily be installed is provided in this isolating gap, for reliable grounding of the end bolt (15).

10 Claims, 6 Drawing Sheets

CABLE CONNECTION FOR A METAL-ENCAPSULATED, GAS-INSULATED, HIGH-VOLTAGE SWITCHING INSTALLATION

BACKGROUND OF THE INVENTION

1. Field of the Invention

The invention is based on a cable connection for a metal-encapsulated, gas-insulated, high-voltage switching installation according to the preamble of claim 1.

2. Discussion of Background

Conventional cable connections which are designed for the connection of single-phase high-voltage cables to single-phase, metal-encapsulated, gas-insulated switching installations, are comparatively costly to install since additional matching tasks always have to be carried out. In addition, until now, it has been possible to separate the high-voltage cable from the gas-insulated switching installation only in a comparatively cumbersome manner when said switching installation has been subjected to the normal high-voltage tests for checking during maintenance or after inspections.

SUMMARY OF THE INVENTION

Accordingly, one object of the invention, as it is defined in Patent claim 1, is to provide a novel cable connection for a single-phase, metal-encapsulated, gas-insulated, high-voltage switching installation, which cable connection makes it possible to install and remove the high-voltage cable easily and quickly and which makes grounding of this cable possible reliably and in a manner which can be installed simply.

The cable connection is provided for a single-phase, metal-encapsulated, gas-insulated, high-voltage switching installation. It has a connection enclosure which surrounds connecting parts which are connected to the active parts of the gas-insulated, high-voltage switching installation. Furthermore, it has cable connection encapsulation, which is connected to the connection enclosure and surrounds a cable termination with an end bolt. An electrically conductive connecting piece is inserted between the end bolt and the connecting parts. The electrically conductive connecting piece is constructed such that it can easily be removed. After removal of the connecting piece, a separation which is designed as an isolating gap is produced between the end bolt and the connecting parts of the gas-insulated switching installation. A grounding device, which can easily be installed, is provided in this isolating gap, for reliable grounding of the end bolt. Such a refinement of the cable connection is highly favorable and allows a wide range of different high-voltage tests without having to endanger the installation personnel during the preparatory tasks for these tests.

The electrically conductive connecting piece is constructed as a cylindrical isolating rod which, on the one hand, can be pushed into an electrically conductive contact-making arrangement of a cross-connecting piece and which, on the other hand, is constructed as electrically conductive connection to the end bolt. The cross-connecting piece is electrically conductively connected via a removable isolating piece to the active parts. The isolating piece is designed as an interlock for the isolating rod, in order to increase the operating reliability.

A mounting groove is provided in the interior of the cable connection encapsulation or internally in an intermediate flange, which is inserted between the cable connection encapsulation and the connection enclosure, for the installation of the grounding device.

The further refinements of the invention are the subject matter of the dependent claims.

The invention, its development and the advantages which can be achieved with it are described in more detail in the following text, with reference to the drawing, which illustrates only one possible embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Elements having the same effect are provided with the same reference designations in all the figures. Only those elements which are required for direct understanding of the invention are illustrated.

DESCRIPTION OF THE PREFERRED EMBODIMENTS

Figure 1:
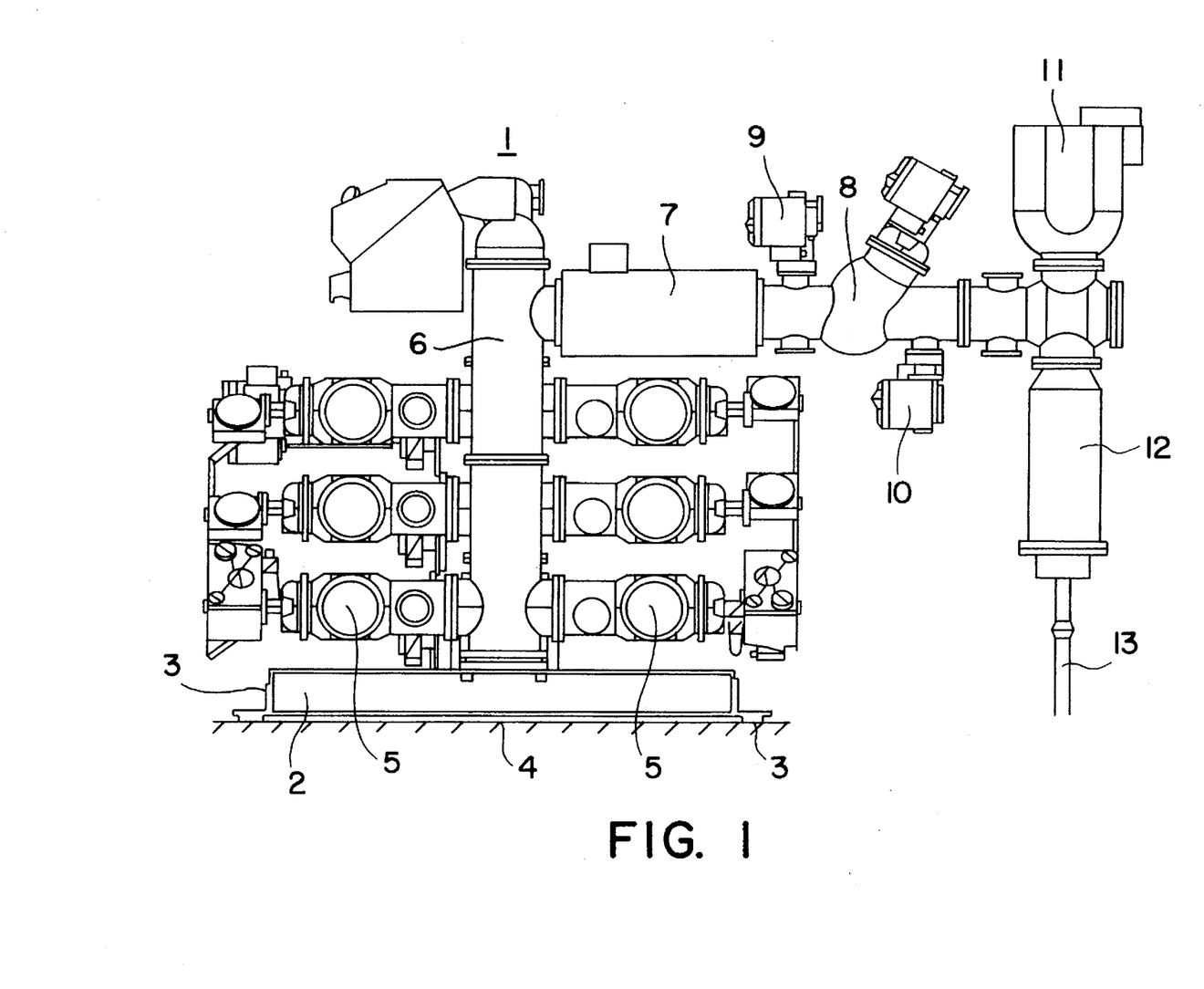
FIG. 1 shows a side view of an outlet panel of a metal-encapsulated, gas-insulated switching installation having a built-in cable connection according to the invention.

Referring now to the drawings, wherein like reference numerals designate identical, or corresponding parts throughout the several views, FIG. 1 shows a schematically illustrated side view of an outlet panel 1 of a single-phase, metal-encapsulated, gas-insulated switching installation. This outlet panel 1 has a supporting frame 2, which is manufactured from a metal section. Angled sections 3, which are used for connection of the supporting frame 2 to a foundation 4, are fitted to the corners of the supporting frame 2. This connection can be constructed in a force-fitting manner, but it can also allow the supporting frame 2 to slide on a supporting rail which is incorporated in the foundation 4 and is not illustrated here. In the case of this type of metal-encapsulated, gas-insulated switching installation, the busbars 5 are arranged vertically one above the other on one or both sides of the vertically positioned circuit breakers 6.

The outlet is provided with a current transformer 7, downstream of which an isolator 8 is connected. A grounding switch 9, 10 is in each case installed in the enclosure of the isolator 8 on both sides of the isolator 8, here. A voltage converter 11 is provided downstream of the isolator 8. A cable connection 12 connects the outgoing high-voltage cable 13 to the gas-insulated switching installation. The busbars 5 each have one longitudinal axis. The longitudinal axes of each of the two busbar systems lie in a plane, vertically one above the other.

Figure 2:
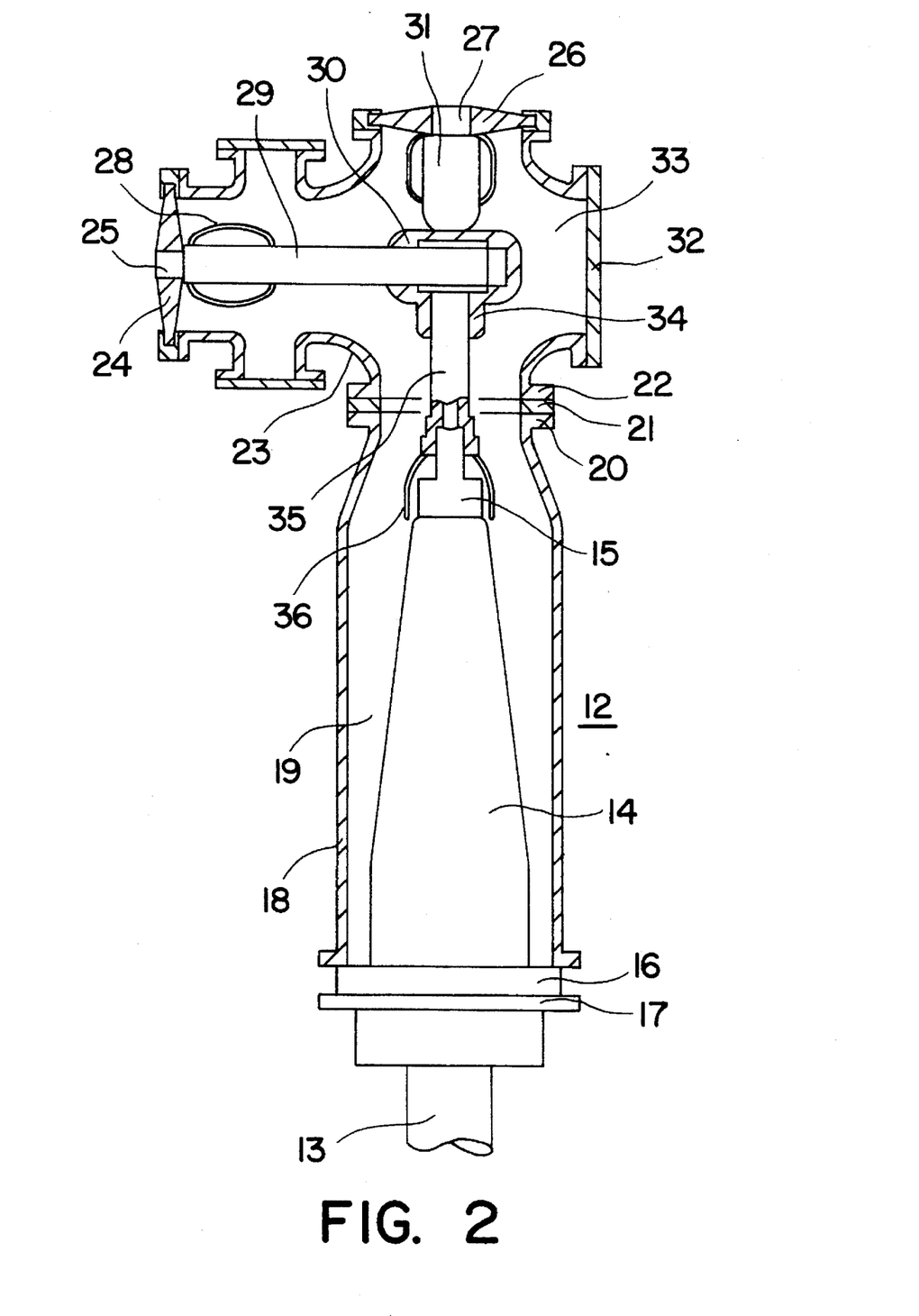
FIG. 2 shows a highly simplified section through the cable connection.

FIG. 2 shows a highly simplified section through the cable connection 12. The outgoing high-voltage cable 13 is provided with a cable termination 14 to whose end termination an electrically conductive end bolt 15 is fitted. The cable termination 14 additionally has a termination flange 16 which is pressed in a pressure tight manner against a cable connection encapsulation 18, by means of a thrust ring 17. The cable connection encapsulation 18 encloses the cable termination 14 and a volume 19 which surrounds said cable termination 14 and is filled with insulating gas. The cable connection encapsulation 18 is provided with a connecting flange 20 which is screwed in a pressure tight manner, via an intermediate flange 21, to a connecting flange 22 of a connection enclosure 23 of the metal-encapsulated, gas-insulated switching installation. The volume 19 is connected to the interior of the connection enclosure 23, which is filled with insulating gas.

The connection enclosure 23 has a first opening which is closed by a supporting insulator 24 constructed as a compartment insulator. An electrical connection 25 is passed through the supporting insulator 24 and electrically conductively connects those active parts which are enclosed by the connection enclosure 23 to the active parts in the rest of the gas-insulated switching installation, these being the active parts of the adjacent isolator 8 here. The connection enclosure 23 additionally has a second opening, which is closed by a supporting insulator 26 constructed as a compartment insulator. An electrical connection 27 is passed through the supporting insulator 26 and connects those active parts which are enclosed by the connection enclosure 23 to the voltage converter 11 which is here flange connected at the top to the connection enclosure 23.

Within the connection enclosure 23, the electrical connection 25 is connected to a contact-making arrangement which is not illustrated here and is arranged in the interior of a shield 28. A removable isolating piece 29, which is constructed in the form of a tube or bolt and produces the electrical connection to a cross-connecting piece 30, is pushed into this contact-making arrangement. The cross-connecting piece 30 is held in position by a conductor piece 31, which is electrically conductively connected to the electrical connection 27. The connection enclosure 23 has a further opening 33, which is closed in a pressure tight manner by a closure flange 32. This opening 33 is used as an installation opening when the isolating piece 29 is installed or removed. If two parallel high-voltage cables 13 are intended to be connected to the metal-encapsulated, gas-insulated switching installation, a further connection enclosure 23, which contains the corresponding active parts and which is connected to a further cable connection 12, can be flange connected to the opening 33. Only the removable isolating piece 29 need be correspondingly lengthened for the electrical connection to the active parts of the rest of the gas-insulated switching installation.

A contact-making arrangement 34, into which an isolating rod 35 is pushed, is provided on the side of the cross-connecting piece 30 opposite the conductor piece 31. The construction of this region can be seen in FIG. 3. The isolating rod 35 produces the electrical connection to the end bolt 15 of the cable termination 14. The isolating piece 29 can be removed, if required, through the cross-connecting piece 30. When installed, the isolating piece 29 prevents the isolating rod 35 being able to be moved out of the cross-connecting piece 30 upwards. The isolating piece 29 can be installed only when the isolating rod 35 is removed or when it is definitely in position. The isolating piece 29 is designed as an additional interlock for the isolating rod 35. The conductor piece 31 must be removed before removal of the isolating rod 35. A shield 36 ensures that the edges of the end bolt 15 have no interfering effect on the electrical field in this region.

Figure 3:
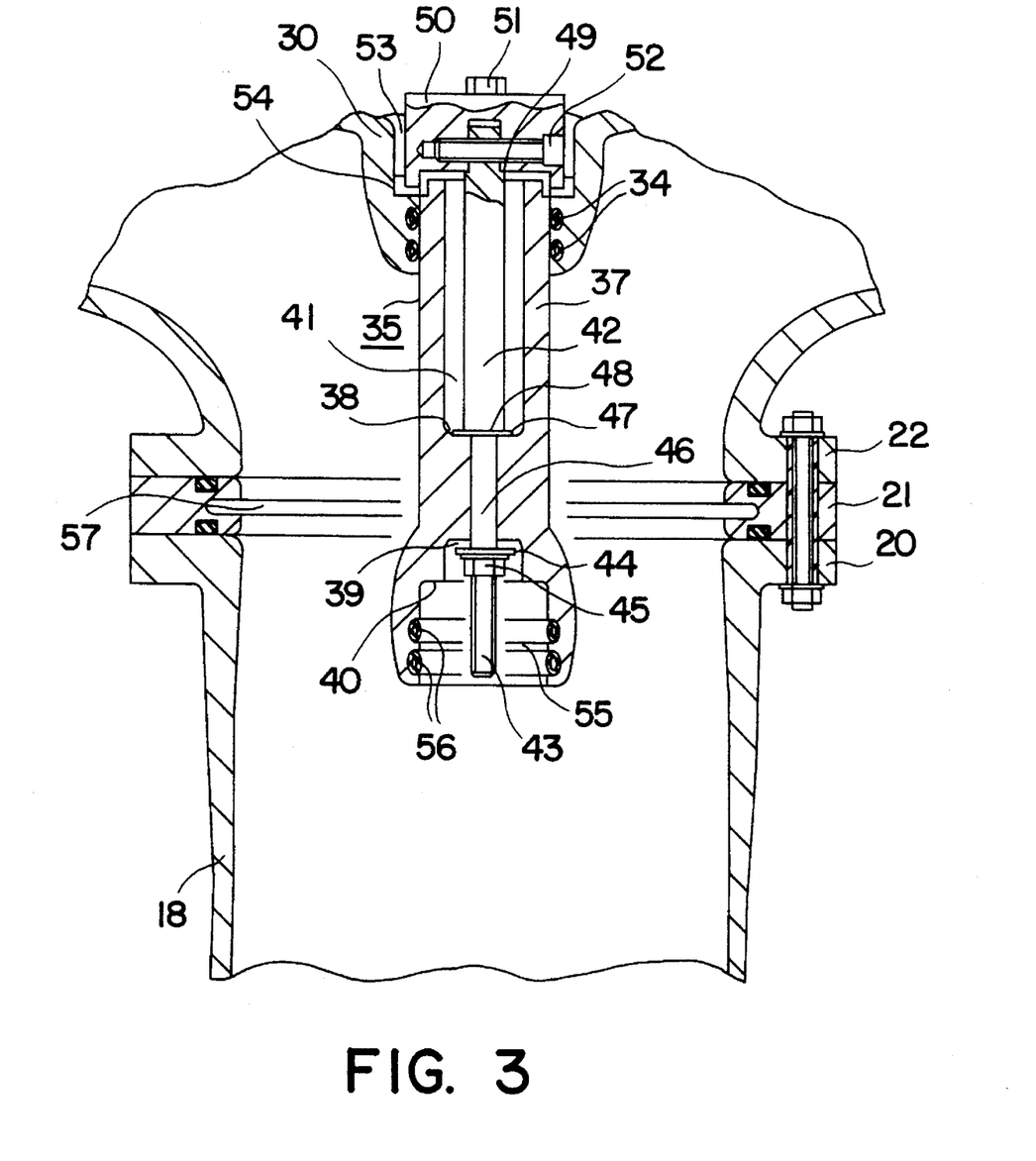
FIG. 3 shows a simplified partial section through the region of the metal-encapsulated, gas-insulated switching installation where the high-voltage cable which is to be connected is electrically conductively connected to the active parts of the switching installation.

The partial section which is illustrated in simplified form in FIG. 3 shows the region of the metal-encapsulated, gas-insulated switching installation where the isolating rod 35 electrically conductively connects the high-voltage cable 13, which is to be connected, to the cross-connection point 30 and thus to the active parts in the rest of the switching installation. The isolating rod 35 has an essentially cylindrically constructed conductor element 37, made of metal, with a central hole 41 which has a plurality of steps 38, 39, 40. A threaded bolt 42 is guided in the hole 41 such that it can rotate. At its lower end, the threaded bolt 42 has a shank 43 which is provided with a thread and onto which a washer 44 is pushed. A nut 45, which holds the washer 44, is additionally screwed onto the shank 43. Adjoining the shank 43, the threaded bolt 42 has a further shank 46, which is designed with a smooth surface and has a somewhat larger diameter. The shank 46 is guided radially through a somewhat narrower region of the hole 41. The somewhat narrower region of the hole 41 ends at the step 38. A washer 47, through which the shank 46 extends, is located on the step 38. The threaded bolt 42 has a step 48 which rests on the washer 47.

A cylindrically constructed mating piece 50 on whose top a hexagon 51 is integrally formed rests on a further step 49 on the threaded bolt 42. The upper end of the threaded bolt 42 projects into a central cut-out on the bottom of the mating piece 50. A driver screw 52 passes through the mating piece 50 and a transverse hole through the centre of the threaded bolt 42, so that these two parts can interact. The driver screw 52 is screwed to the mating piece 50 and does not need to be secured since the axis of the driver screw 52 is located, when the isolating rod 35 is correctly installed, underneath the edge of a cut-out 53 which is incorporated in the cross-connecting piece 30 for the mating piece 50, so that it is impossible for the driver screw 52 to become loose in operation.

The base of the cut-out 53 is covered by an insulating ring 54 which has, for example, an L-shaped cross section. The mating piece 50 is supported on this ring 54 so that no metallic wear can occur, during rotation of the mating piece 50. The ring 54 additionally prevents the mating piece 50 being able to touch the inner wall of the cut-out 53 laterally. This insulation is necessary in order to avoid stray currents in operation flowing directly via the threaded bolt 42, the driver screw 52 and the mating piece 50, and past the contact-making arrangement 34 which is provided with spiral contacts for the current flow,, into the cross-connecting piece 30 and, in so doing, producing unacceptable arcing spots and disturbing dust particles associated with them as well. In order to avoid metallic wear particles, washers made of plastic, for example of Teflon, can also be provided on both sides of the washer 44 as well as on both sides of the washer 47.

After installation of the threaded bolt 42 into the conductor element 37, the nut 45 is firmly connected to the threaded bolt 42, it being possible to do this by bonding, for example. The hole 41 is constructed in the lowermost part as a contact-making arrangement 55, in the case of which spiral contacts 56 are inserted into two grooves. The electrically conductive connection between the isolating rod 35 and the end bolt 15 is ensured by this contact-making arrangement 55.

FIG. 3 additionally illustrates the intermediate flange 21 somewhat more clearly. The intermediate flange 21 is provided on its inside with a mounting groove 57 which has parallel flanks and is provided for the installation of elements of a grounding device. The mounting groove 57 can also be incorporated in the upper part of the cable connection encapsulation 18, especially in the connecting flange 20, or else in the connecting flange 22 of the connection enclosure 23, in which case it would be possible to omit the intermediate flange 21. On its ends facing the connection enclosure 23 and the cable connection encapsulation 18, the intermediate flange 21 additionally has in each case one groove, which is not shown and is provided with O-rings. In addition, further grooves, which are not illustrated however, are also fitted on the ends, for the insertion of corrosion protection grease.

Figure 4:
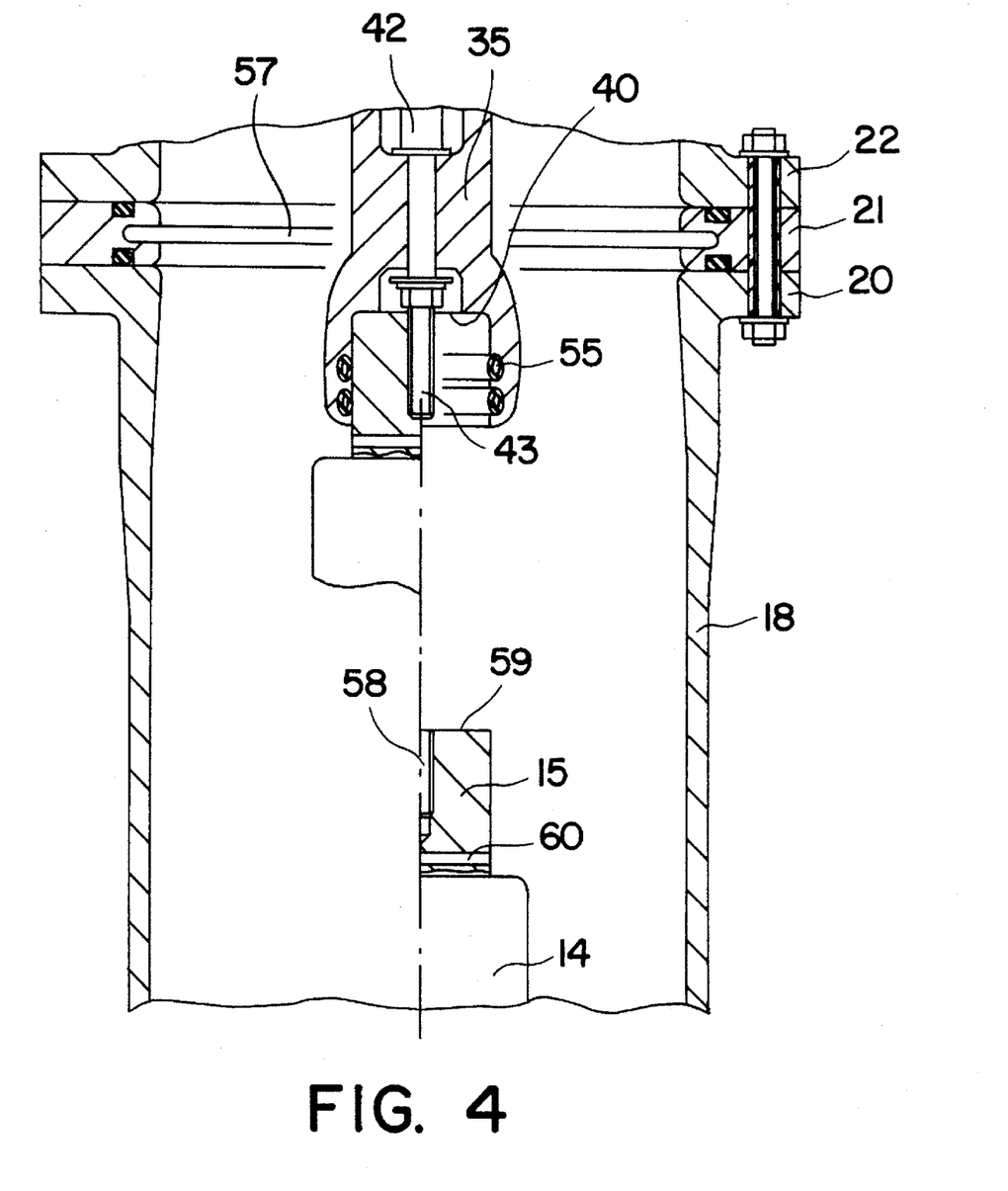
FIG. 4 shows a simplified partial section through a first cable connection according to the invention, the connected high-voltage cable being illustrated to the left of a longitudinal axis and the high-voltage cable and the cable termination before connection being illustrated to the right of the longitudinal axis.

FIG. 4 shows a simplified partial section through a first cable connection according to the invention. The end bolt 50, which is used here, of the cable termination 14 fits directly into the contact-making arrangement 55 of the isolating rod 35. The end bolt 15 has a threaded hole 58 in the center, into which threaded hole 58 the thread of the shank 43 of the threaded bolt 42 fits. If the shank 43 is engaged with the threaded hole 58, then the threaded bolt 42 can be rotated by corresponding rotation on the hexagon 51 such that the end bolt 15 is drawn with its end 59 in the direction of the step 40 on the isolating rod 35, into the contact-making arrangement 55. As soon as the end 59 rests against the step 40 and the hexagon 51 is tightened to a predetermined torque, the current path of the cable connection has been correctly produced. The hexagon 51 of the mating piece 50 now no longer projects into the path of the isolating piece 29, which provides further information that the current path of the cable connection has been correctly produced, so that the isolating piece 29 can be installed subsequently. The end bolt 15 is provided with a hole 60, which is provided for the insertion of a plug. In the case of such a cable termination 14, the connection between the end bolt 15 and the isolating rod 35 must additionally absorb the pressure forces which are exerted on the cable termination 14 by the pressure of the insulating gas, for example $SF_6$, prevailing in the volume 19 when the cable connection 12 is completely installed.

Figure 5:
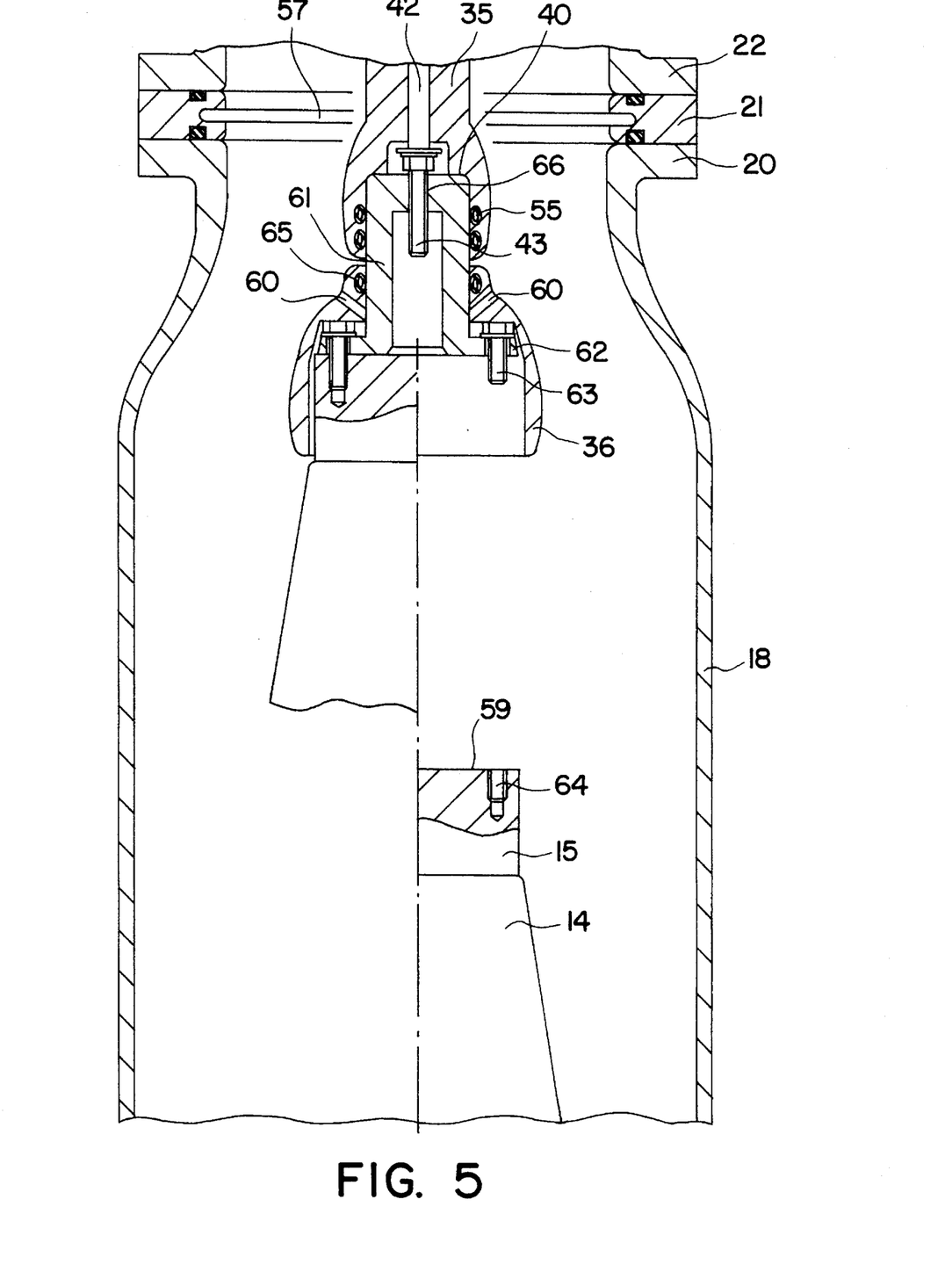
FIG. 5 shows a simplified partial section through a second cable connection according to the invention, the connected high-voltage cable being illustrated to the left of a longitudinal axis and the high-voltage cable and the cable termination before connection being illustrated to the right of the longitudinal axis.

FIG. 5 shows a simplified partial section through a second cable connection according to the invention. The end bolt 15, which is used here, of the cable termination 14 does not fit directly into the contact-making arrangement 55 of the isolating rod 35, which corresponds to the dimensions according to those shown in FIG. 4. A fitting adaptor 61 is additionally interposed here, which has a cylindrical part which fits into the contact-making arrangement 55 and is provided with a flange 62 which fits onto the end 59 of the end bolt 15. The flange 62 is connected to the end bolt 15 by means of screws 63 which fit into corresponding threaded holes 64 in the end 59. The adaptor 61 is manufactured from an electrically highly conductive metal. Its contact-making points are silver-plated, as are those of the other contact-making points lying in the current path. A shield 36, which dielectrically shields the edges of the flange 62 and those of the screws 63, is pushed over the cylindrical part of the adaptor 61. The shield 36 must make good electrical contact with the adaptor 61, this being achieved by introducing a groove, which is provided with spiral contacts 65, internally into the shield 36.

The shield 36 is provided with holes 60, which are intended for the insertion of a plug.

In the center of its side facing the isolating rod 35, the adaptor 61 has a threaded hole 66 into which the thread on the shank 43 of the threaded bolt 42 fits. When the shank 43 is engaged with the threaded hole 66, then the threaded bolt 42 can be rotated, by corresponding rotation on the hexagon 51, such that the adaptor 61 and, with it, the end bolt 15 with its end 59, are drawn into the contact-making arrangement 55, in the direction of the step 40 on the isolating rod 35. As soon as the end of the adaptor 61 is resting against the step 40, and the hexagon 51 has been tightened to a predetermined torque, the current path of the cable connection has been produced correctly. The hexagon 51 of the mating piece 50 now no longer projects into the path of the isolating piece 29, which provides further information on the fact that the current path of the cable connection has been produced correctly, so that the isolating piece 29 can subsequently be installed. In the case of a cable termination 14 which is constructed in such a manner, the connection between the end bolt 15 and the isolating rod 35 need not absorb any additional pressure forces which are exerted on the cable termination 14 by the pressure of the insulating gas, for example $SF_6$, prevailing in the volume 19 when the cable connection 12 is completely installed, since, in this type, the conically constructed outer wall of the cable termination 14, which is composed of solid insulation, absorbs the gas pressure.

The adaptor 61 can also be constructed to fit other types of end bolt 15, so that cable terminations 14 other than the two shown here, which are provided for high-voltage cables insulated by solid materials, can also be connected without any problems to the metal-encapsulated, gas-insulated switching installation. It is also conceivable for the cable connection encapsulation 18 to be correspondingly adapted, if required. In correspondingly modified form, the cable connection 12 can also be used for the connection of oil-filled cables.

Figure 6:
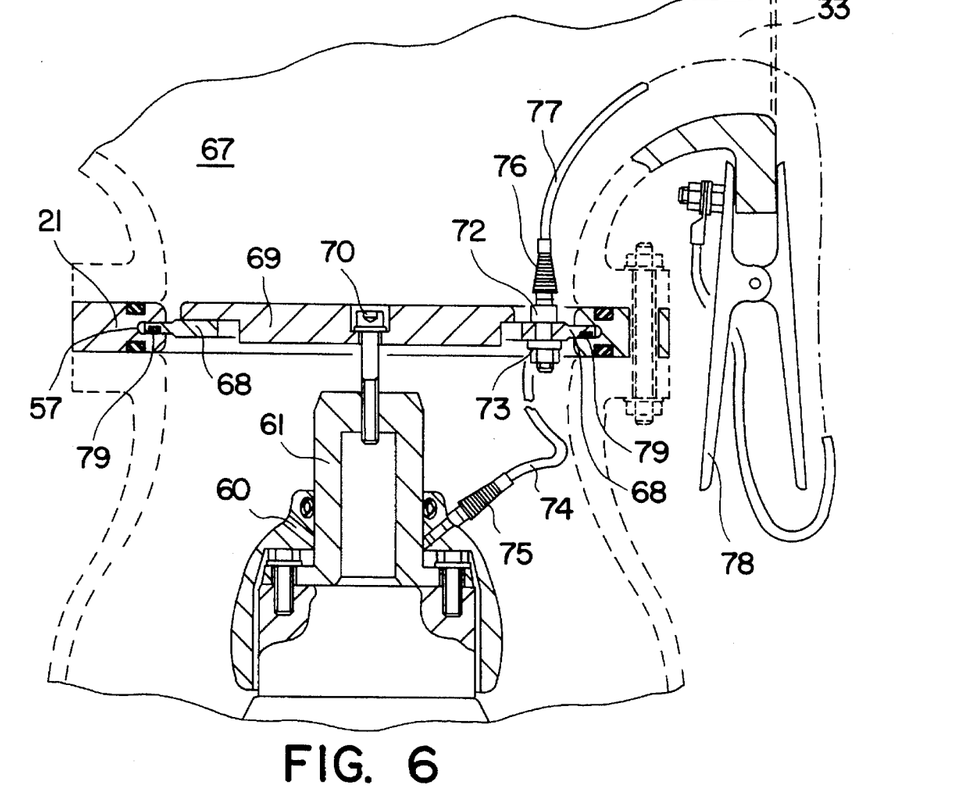
FIG. 6 shows a grounding device for installation in a cable connection.
Figure 7:
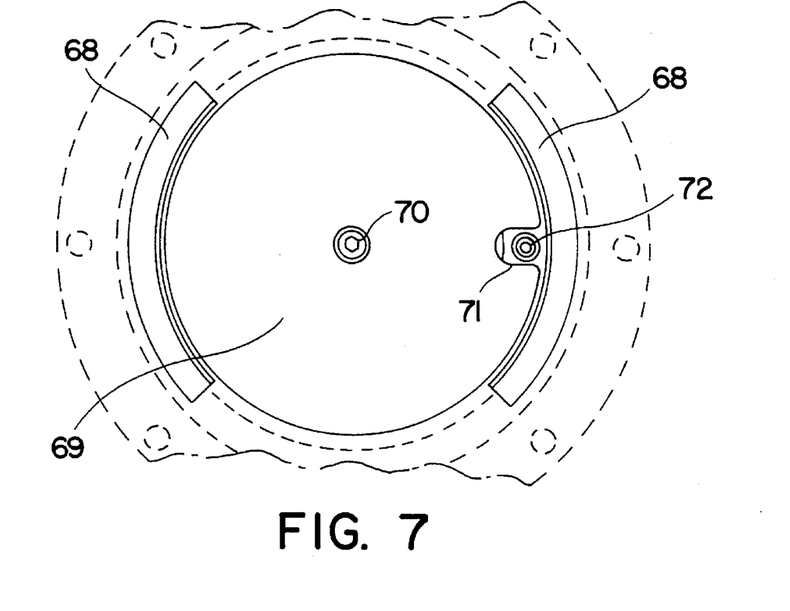
FIG. 7 shows a plan view, illustrated in simplified form, of the grounding device according to FIG. 6.

FIG. 6 shows a grounding device 67 for installation in cable connections of the type already described. FIG. 7 shows a plan view, which is illustrated in simplified form, of the grounding device 67 according to FIG. 6. The outlines of the enclosure which surrounds this device are illustrated only by dashed lines, for the sake of better clarity. The isolating rod 35 has been removed before installation of this grounding device 67, so that a sufficiently large isolating gap is produced between the end bolt 15 and/or the adaptor 61 and the cross-connecting piece 30. Two segments 68, located approximately opposite one another are here pushed into the mounting groove 57 of the intermediate flange 21. The segments 68 are cut from a ring and are approximately so wide that it is impossible for a circular plate 69 placed on them during installation to pass through between them, while nevertheless maintaining sufficient play that any casting tolerances in the enclosures cannot adversely affect the operability of the grounding device 67. A screw 70, which connects the plate 69 to the adaptor 61 and presses the plate 69 against the segments 68, passes through the center of the plate 69.

In addition, the plate 69 has a cut-out 71, which leaves space for a plug socket 72 which is screwed into one of the segments 68 and projects upwards out of the segment 68. The plug socket 72 passes through the segment 68. A flexible insulated cable 74 is permanently mounted on the plug socket 72 and thus on the segment 68, by means of a screw connection 73, on the underneath. At the other end, the cable 74 has a plug 75 which is inserted into one of the holes 60. The cable 74 electrically conductively connects the shield 36, and the adaptor 61 which is connected to it, to the segment 68, which is at the potential of the enclosures, this being ground potential as a rule. A further plug 76, which is mounted on a flexible insulated cable 77, is inserted into the plug socket 72. The cable 77 passes through the opening 33 out of the connection enclosure 23 to metallically bare clamping tongs 78, which are firmly clamped to a flange on the connection enclosure 23. The cable 77 connects the segment 68 to the potential of the connection enclosure 23.

In order to produce a good electrical contact between the segments 68 and the intermediate flange 21, that part of the at least two segments 68 of the grounding device 67 which is pushed into the mounting groove 57 is provided with an O-ring 79 which is bonded into a groove, which is not shown, such that it projects. The thickness of the segments 68 which are provided with the O-ring 79 is somewhat larger than the width of the opening in the mounting groove 57, which has parallel flanks, so that, during insertion of the segments 68 into the mounting groove 57, scratching always occurs between the segments 68 and the metallic flanks of the mounting groove 57, as a result of which any poorly conductive oxide layers are broken off at least at some points, so that this ensures that a comparatively good electrical contact is always made. The O-ring 79 additionally prevents the segments 68 sliding out of the mounting groove 57. As soon as the plate 69 is placed on the segments 68, the shape of this plate 69 additionally makes it impossible for the segments 68 to slide out of the mounting groove 57.

During installation of the grounding device 67, the segment 68 is initially connected via the cable 77 to the clamping tongs 78. After this, the clamping tongs 78 are conductively connected to a flange of the connection enclosure 23. Once the segment 68 has been reliably grounded in this way, it is inserted, together with the cable 74 which is firmly fitted to it, through the opening 33 into the isolating gap. Here, the plug 75, which is fitted to the cable 74, is first plugged into one of the holes 60 which are provided for this purpose. In consequence, the end bolt 15 is correctly grounded, and any hazard to the installation personnel is thus precluded. The segment 68, which is firmly connected to the cable 74, can now be pushed into the mounting groove 57. The end bolt 15 is now electrically conductively connected to the enclosures and grounding of the high-voltage cable 13 in accordance with the specifications is ensured.

After this, the cable 77 is separated from the segment 68, with the aid of the plug 76, and the clamping tongs 78 are likewise removed. The second of the segments can now also be installed safely. After this, the plate 69 is fitted and is connected in a force-fitting manner to the end bolt 15 by means of the screw 70. The opening 33 is now closed again in a pressure tight manner by means of the closure flange 32. This part of the installation can now be filled with insulating gas, for example with SF6, before the high-voltage test, in a known manner. The grounding device 67 ensures that it is impossible for the high voltage which is applied to the active parts of the metal-encapsulated, gas-insulated switching installation for the test to reach the cable termination 14 and the high-voltage cable 13. After completion of the high-voltage test, the grounding device 67 is removed again, step by step, in the opposite sequence to that for installation, so that no danger to the installation personnel can occur in this case either.

If the high-voltage cable 13 is intended to be subjected to a high-voltage test, then the isolating rod 35 remains installed, the isolating piece 29 is removed, and the test voltage, which is applied to the high-voltage cable 13, is fed in via the electrical connection 27 with the aid of a test bushing which has been fitted.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A cable connection for a single-phase metal-encapsulated, gas-insulated, high-voltage switching installation having a connection enclosure (23) which surrounds connecting parts which are connected to the active parts of the gas-insulated, high-voltage switching installation, having cable connection encapsulation (18) which is connected to the connection enclosure (23) and surrounds a cable termination (14) with an end bolt (15), having an electrically conductive connecting piece which is inserted between the end bolt (15) and the connecting parts, wherein the electrically conductive connecting piece is constructed such that it can easily be removed after removal of the connecting piece, a separation, which is designed as an isolating gap, is produced between the end bolt (15) and the connecting parts, and a grounding device (67), which can easily be installed, is provided in this isolating gap for reliable grounding of the end bolt (15).

2. The cable connection as claimed in claim 1, wherein the electrically conductive connecting piece is constructed as a cylindrical isolating rod (35) which, on the one hand, can be pushed into an electrically conductive contact-making arrangement (34) of a cross-connecting piece (30) and which, on the other hand, is designed for electrically conductive connection to the end bolt (15).

3. The cable connection as claimed in claim 2, wherein the cross-connecting piece (30) is electrically conductively connected via a removable isolating piece (29) to the active parts, and the isolating piece (29) is designed as an additional interlock for the isolating rod (35).

4. The cable connection as claimed in claim 2, wherein a cylindrically constructed contact-making arrangement (55) is provided for the electrically conductive connection of the cylindrical isolating rod (35) to the end bolt (15), which contact-making arrangement (55) is integrally formed on the corresponding end of the isolating rod (35), is provided with spiral contacts and surrounds the end bolt (15).

5. The cable connection as claimed in claim 4, wherein a threaded bolt (42) which passes through the isolating rod (35) fixes the end bolt (15) in the contact-making arrangement (55).

6. The cable connection as claimed in claim 5, wherein the threaded bolt (42) is connected by means of a driver screw (52) to a mating piece (50) which is mounted in the cross-connecting piece (30) such that it can rotate.

7. The cable connection as claimed in claim 1, wherein a mounting groove (57) is provided internally in an intermediate flange (21) for the installation of the grounding device (67), which intermediate flange (21) is inserted between the cable connection encapsulation (18) and the connection enclosure (23).

8. The cable connection as claimed in claim 7, wherein the grounding device (67) has at least two segments (68) which are made of metal and are pushed into the mounting groove (57), a plate (69), which is connected to the end bolt (15), is supported on the at least two segments (68), and the end bolt (15) is electrically conductively connected with the aid of a grounding connection to at least one of the segments (68).

9. The cable connection as claimed in claim 1, wherein that part of the at least two segments (68) of the grounding device (67) which is pushed into the mounting groove (57) is provided with an O-ring (79) which is bonded into a groove such that it projects, and the thickness of that segment (68) which is provided with the O-ring (79) is somewhat larger than the width of the mounting groove (57).

10. The cable connection as claimed in claim 8, wherein the grounding connection is permanently connected to at least one of the segments (68), while it is designed such that it can be plugged onto the end bolt (15), and the grounding connection is designed as an insulating cable (74).

\* \* \* \* \*